(12) United States Patent
Mouallem et al.

(10) Patent No.: US 11,934,544 B2
(45) Date of Patent: Mar. 19, 2024

(54) SECURING DATA VIA ENCRYPTED GEO-LOCATED PROVENANCE METADATA

(71) Applicant: Lenovo Global Technology (United States) Inc., Morrisville, NC (US)

(72) Inventors: Pierre Mouallem, Durham, NC (US); William Laurence Jaeger, Pittsboro, NC (US); Scott A. Piper, Kirkland, WA (US); Michael Gerard Demeter, Roswell, GA (US)

( * ) Notice: Subject to any disclaimer, the term of this patent is extended or adjusted under 35 U.S.C. 154(b) by 132 days.

(21) Appl. No.: 17/697,098

(22) Filed: Mar. 17, 2022

(65) Prior Publication Data

US 2023/0297701 A1     Sep. 21, 2023

(51) Int. Cl.
    *G06F 21/62*          (2013.01)
    *H04L 9/40*           (2022.01)

(52) U.S. Cl.
    CPC ............ *G06F 21/62* (2013.01); *H04L 63/107* (2013.01); *G06F 2221/2111* (2013.01)

(58) Field of Classification Search
    CPC ......... G06F 21/62; G06F 2221/2111; H04W 12/63; H04L 63/107
    See application file for complete search history.

(56) References Cited

U.S. PATENT DOCUMENTS

| | | | | |
|---|---|---|---|---|
| 9,652,460 | B1 * | 5/2017 | Barisic ............... | G06F 16/2471 |
| 11,550,943 | B2 * | 1/2023 | Linga ................. | G06F 21/64 |
| 2005/0275553 | A1 * | 12/2005 | Weekes ................ | A45C 13/24 |
| | | | | 340/652 |
| 2007/0296581 | A1 * | 12/2007 | Schnee .............. | G08B 13/2482 |
| | | | | 340/8.1 |
| 2017/0206030 | A1 * | 7/2017 | Woo .................... | G06F 12/1408 |
| 2017/0237747 | A1 * | 8/2017 | Quinn ................ | G06F 21/602 |
| | | | | 726/29 |
| 2018/0191506 | A1 * | 7/2018 | Vilvovsky .............. | H04L 9/14 |
| 2021/0068203 | A1 * | 3/2021 | Katrib .............. | H04N 21/21805 |
| 2021/0273812 | A1 * | 9/2021 | Hardin ................ | H04L 9/0637 |

FOREIGN PATENT DOCUMENTS

WO     WO-2020130899 A1 *   6/2020         G06F 16/2365

* cited by examiner

*Primary Examiner* — Madhuri R Herzog

(74) *Attorney, Agent, or Firm* — Jeffrey L. Streets

(57) ABSTRACT

Target data may be associated with a location requirement established by a data owner. A data access module may be used to attempt access to the target data. Location requirement and provenance metadata associated with the target data are obtained. The provenance metadata must be validated, and evidence only approved data access locations identified in the location requirement. A current location of a computing device attempting access to the target data must also meet the location requirement. The computing device is allowed to access the target data only in response to the current location and each location identified in the provenance metadata meeting the location requirement. The provenance metadata is updated to include a new record including the current data access location.

19 Claims, 6 Drawing Sheets

| Rule Set / Location Requirements (Target Data) ||
|---|---|
| Approved Locations for Data Access (exclusive) | Location Description (Coordinates, tower, access pt) |
| A | latitude, longitude H |
| B | cell tower I |
| C | cell tower J |
| D | latitude, longitude K |
| E | WiFi Access Point L |

SECURING DATA VIA ENCRYPTED GEO-LOCATED PROVENANCE METADATA

BACKGROUND

The present disclosure relates to data security using geo-location metadata.

BACKGROUND OF THE RELATED ART

It is important to implement data security measures to protect unauthorized individuals and devices from accessing private or valuable data. For example, a firewall is a network security system that monitors and controls incoming and outgoing network traffic using one or more predetermined security rules. Accordingly, the firewall forms a barrier between a trusted network containing the private or valuable data and an untrusted network such as the Internet. In order to gain access to the trusted network, an individual or device must have sufficient security credentials.

Some data security measures include limiting the movement of data. For example, some data security measures may prevent certain data from being sent beyond a particular data center or local area network. Similarly, some data security measures may only allow access to certain data after validating that the data is in a predetermined location. However, these data security measures do not guarantee that the data has only been accessed or modified in approved locations throughout the data lifecycle. The limitation of these data security measures is especially problematic when the list of approved locations changes over time.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations include identifying target data associated with a location requirement established by a data owner, obtaining the location requirement and provenance metadata associated with the target data, and determining whether the provenance metadata has been tampered with, wherein the provenance metadata identifies a location associated) with each previous instance of access to the target data. The operations also include identifying a current location of a computing device that includes the processor and determining whether the identified current location of the computing device meets the location requirement. The operations further include determining, for each location identified in the provenance metadata, whether the location meets the location requirement, and allowing the computing device to access the target data only in response to determining that the current location and each location identified in the provenance metadata meet the location requirement. Still further, the operations include updating the provenance metadata to include a new record including the current location of the computing device in response to allowing the computing device to access the target data.

DETAILED DESCRIPTION

Figure 1:
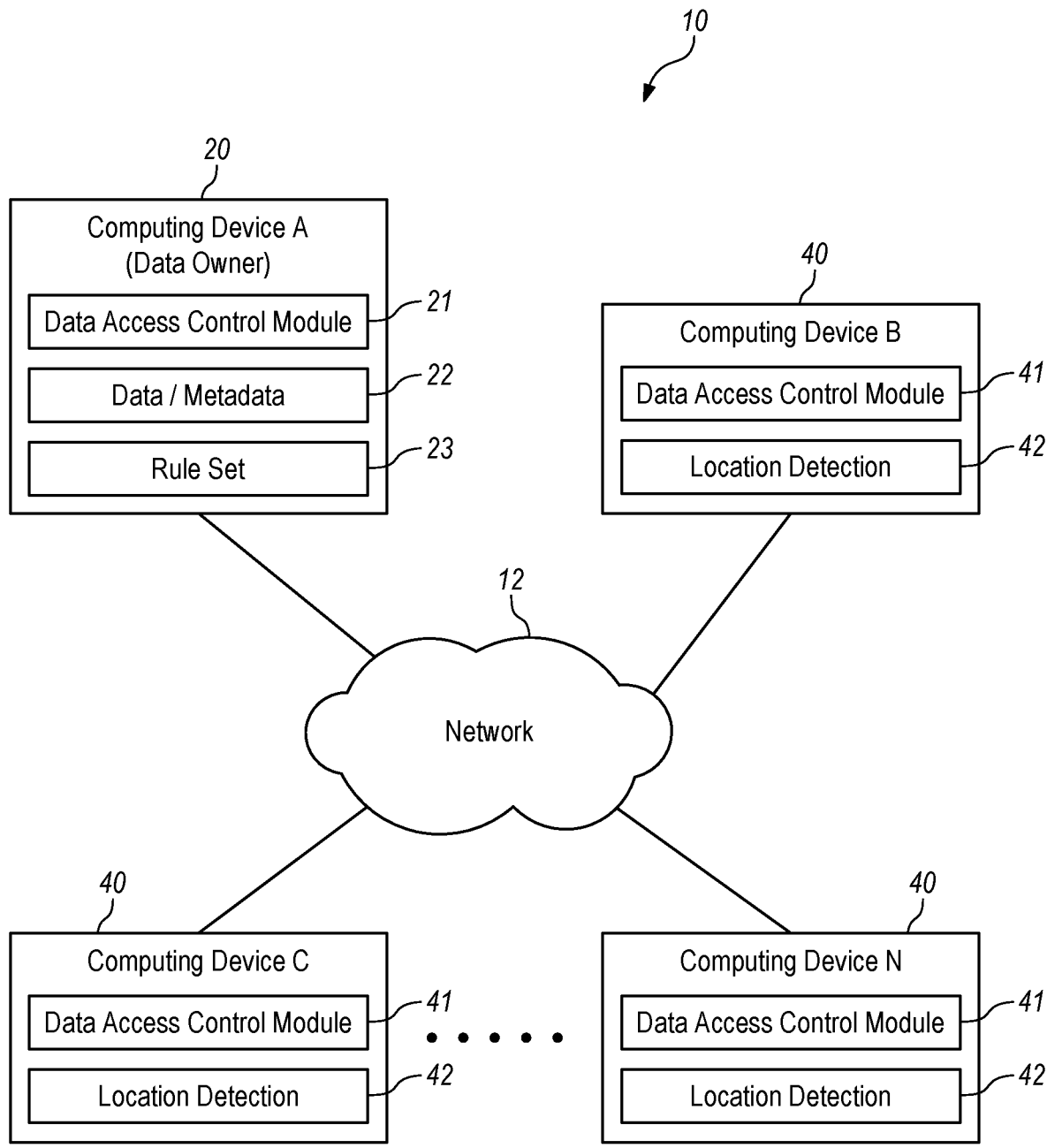
FIG. 1 is a diagram of a system including a plurality of computing devices including a data owner computing device and other computing devices that may attempt access to target data.

Some embodiments provide a computer program product comprising a non-volatile computer readable medium and non-transitory program instructions embodied therein, the program instructions being configured to be executable by a processor to cause the processor to perform various operations. The operations include identifying target data associated with a location requirement established by a data owner, obtaining the location requirement and provenance metadata associated with the target data, and determining whether the provenance metadata has been tampered with, wherein the provenance metadata identifies a location associated with each previous instance of access to the target data. The operations also include identifying a current location of a computing device that includes the processor and determining whether the identified current location of the computing device meets the location requirement. The operations further include determining, for each location identified in the provenance metadata, whether the location meets the location requirement, and allowing the computing device to access the target data only in response to determining that the current location and each location identified in the provenance metadata meet the location requirement. Still further, the operations include updating the provenance metadata to include a new record including the current location of the computing device in response to allowing the computing device to access the target data.

In some embodiments, the target data may be contained within an identified file, folder, and/or data storage device. For example, the data may be contained within one or more particular data file or data structure. In another example, the data may be contained within a particular folder containing one or more data file or other data structure, including sub-folders. Still further, the data may be contained on a particular data storage device, such as a disk drive, partition or slice. Optionally, the data may be identified by a name, such as a filename, folder name, or data storage device name. The target data may have any suitable data structure or format for general use or for use by a particular application or application type. In one implementation, the target data, the location requirement and the provenance metadata may each be obtained from a common source. For example, the target data, the location requirement and the provenance metadata could be stored together in a common folder.

In some embodiments, the location requirement may be the only requirement for granting access to the target data. In other embodiments, the location requirement may be included in a rule set that further includes one or more additional conditions that must be met to allow the computing device to access the target data. A rule set may identify one or more conditions that must be satisfied in order to obtain access to the target data. The location requirement and/or a rule set may be established by a data owner and associated with the target data. For example, a rule set may include a location rule or requirement describing restrictions and/or requirements) regarding one or more approved locations of data access as well as one or more other rule describing other restrictions and/or requirements, such as an identity of a person or persons allowed to access the data, a time and/or date range when access to the data is allowed, any other relevant enforceable requirements or restrictions. The rule set can be ordered or unordered based on the needs of the data-owner. Furthermore, the rules in the rule set may include multiple conditions, perhaps including some conditions that are sufficient alone and other conditions that must all be satisfied. In one option, the provenance metadata associated with the target data may be initiated with a first record of the location where the data owner implemented the rule set associated with the particular target data. It should be recognized that one or more approved locations of data access may be expressly identified or may be described in terms of one or more disapproved locations of data access. A data access location is the location of a computing device at the time that the computing device has been enabled to read and utilize the data regardless of where the data was obtained.

In some embodiments, the rule set that includes the location requirement and/or other restrictions or requirements may be stored locally on a computing device as part of a client application used to access the target data. For example, a company may authorize a plurality of computing devices to access the target data and may provide each computing device with a client application, such as a data access control module, that includes the rule set, the encryption key and other modules and/or data. A single encryption/decryption key may be generated by the data owner's encryption/decryption module when the target data is created and protected by the data owner. The encryption key is protected and managed by the encryption/decryption module of each computing device. In one option, the encryption/decryption module may be installed on a computing device as part of a client application, such as a data access control module, that is used to access the target data. Accordingly, the encryption/decryption key may be protected using mechanisms available on the client system itself, such as the Data Protection Application Programming Interface on a Windows operating system.

In some embodiments, the rule set that includes the location requirement and/or other restrictions or requirements may be stored in a central location with a tag identifying the location requirement or rule set that is associated with particular target data. For example, the rule set may be stored on a storage device in a cloud or other network and the rule set and/or encryption key may be protected using mechanisms available to the system hosting the encryption/decryption) module. Cloud based applications may utilize mechanisms provided by the cloud provider, such as a key management application programming interface (API). Furthermore, if the rule set is stored on a network server, then the encryption/decryption module may use capabilities provided by the operating system on the network server, such as the data protection API available on a Windows server.

In some embodiments, the provenance metadata may include a record for each instance of access to the data. The provenance metadata can be considered to be a historical record of each instance of data access and perhaps also each instance of attempted data access. Therefore, the provenance metadata is updated by the data access control module in response to each data access or attempted data access. Each record of the provenance metadata may include the parameters or values that satisfied the rule set to enable the instance of data access, such as the exact location of the data access. Each record of the provenance metadata may further include other parameters or values related to the data access, such as the time and/or date of data access, identity of the person accessing the data, or the identity of the device used to access the data if these parameters are not required by the rule set. Once access to the data is granted, the provenance metadata associated with the data may be updated to include details of the latest data access. For example, the details of the latest data access may include the location of the computing device accessing the data and optional additional data, such as the identity of the user of the computing device and the date and time of the data access. Each update to the provenance metadata may be encrypted by the data access control module and signed by the updating party to prevent any tampering of previous entries or records in the provenance metadata.

In some embodiments, the location where the data access is being requested, performed or attempted may be obtained from the hardware of the computing device being used to attempt data access. For example, the geolocation of the computing device being used for data access may be obtained from an attached global positioning system (GPS) antenna, an Internet Protocol (IP) address of the device, a location of a cellular communication tower connected to the computing device, a location of a wireless access point being used by the computing device, and the like. If the computing device, such as a mobile phone or laptop computer, has a built-in GPS antenna, then the built-in GPS antenna may provide input identifying the location of the computing device at the time that the data access is being attempted and/or carried out. Furthermore, the current location of the computing device may be identified by receiving a location of a cellular communication tower with which the computing device has formed a wireless connection or receiving a location of a wireless access point with which the computing device has formed a wireless connection. It may also be possible to identify the general location of a computing device from its IP address using a geolocation service.

In some embodiments, the data access control module may use encryption to secure the data (i.e., encrypt the data) and prevent the data from being accessed under conditions that do not satisfy the rule set associated with the data and/or to secure the provenance metadata against access or tampering. Accordingly, only after determining that a current request for access to the data satisfies the rule set associated with the data will the data access control module decrypt the data and enable the requesting computing device to access the data.

In some embodiments, the data access control module may include an encryption/decryption engine (module) that performs operations to decrypt and validate that the existing provenance metadata satisfies the rule set and operations to update the provenance metadata by including and encrypting a record of the current data access. The integrity and authenticity of the provenance meta-data is important for providing an accurate indication that the target data has not been accessed outside of location(s) established by the location requirements or rule set or has not been accessed under conditions otherwise violating the restrictions or requirements of the rule set. Accordingly, some embodiments of the data access control module may encrypt provenance meta-data. Encryption of the provenance metadata may be performed using a unique encryption key or the same encryption key as may be used to encrypt the associated target data. Furthermore, each record in the metadata that provides evidence of a data access instance may be signed by the user accessing the data, such as by providing a digital signature that verifies the authenticity of the record. In one alternative to encryption, it is also possible to use a private blockchain to store and manage the provenance meta-data in a manner that is protected against manipulation.

In some embodiments, the data owner may modify the rule set at any time. For example, the rule set may be modified at any time subsequent to initially establishing the rule set. Specifically, the data owner may make multiple modifications to the rule set at multiple different points in time. While access to the target data may be governed by a first (initial) version of the rule set during a first time period, subsequent access to the target data may be governed by a second (modified) version of the rule set during a second time period. Accordingly, the rule set may include multiple versions of a rule, such as a location rule, wherein each version of the rule has their own—effective time range. Therefore, each individual instance of data access in the history of the data access instances identified in the provenance metadata for the target data may be validated against the version of the rule that was in effect at the time of that individual instance of data access. Specifically, the provenance metadata may identify a timestamp associated with each previous instance of access to the target data (i.e., each record), wherein the location requirement includes a first location requirement in force over a first time period and a second location requirement in force over a second time period. Optionally, the operation of determining, for each instance of access to the target data identified in the provenance metadata, whether the location meets the location requirement may include determining, for each instance of access to the target data identified in the provenance metadata, whether the location meets the location requirement that was in force at the timestamp associated with the instance of access to the target data.

In some embodiments, the provenance metadata may be protected by computing a message signature or hash of the provenance metadata each time the provenance metadata is updated to include an additional record documenting an instance of access to the target data. Optionally, each record of access to the target data may include the location where the target data was accessed but may also include additional information such as the identity of a user that accessed the data, the identity of a computing device that was used to access the data, and/or the data and time of the data access. In one non-limiting example, a hash message authentication code (HMAC) or signature may be computed using the HMAC-SHA256 generator, which generates the message signature using the SHA-256 secure hash function. The computed message signature or hash of the provenance metadata is stored along with the provenance metadata for subsequent use in validating the provenance metadata. Specifically, the provenance metadata and the message signature or hash of the provenance metadata maintain an association with the target data and follow the target data so as to be available at any location or time that there may be an attempt to access the target data.

Accordingly, a computing device that is attempting access to the target data may determine whether or not the provenance metadata has been tampered with by using its key and hash generator or function to compute a message signature or hash of the provenance metadata. For example, a key used to compute the message signature or hash may be stored in the encryption/decryption engine of each of a plurality of computing devices authorized to access the) target data. Assuming the computing device attempting to access the target data has an encryption/decryption engine that stores the same algorithm and key used to generate the message signature or hash that accompanies the provenance metadata and target data, then the computing device should be able to independently generate a message signature or hash of the provenance metadata that matches the message signature or hash that accompanies the provenance metadata and target data. However, if the provenance meta-data has been tampered with (i.e., modified by an unauthorized third-party device), then the message signature or hash independently generated by the computing device will not match the message signature or hash that accompanies the provenance metadata and target data. So, the computing device may determine whether or not the provenance metadata has been tampered with by comparing the message signature or hash generated by the computing device with the message signature or hash that accompanies the provenance metadata and target data. If the message signatures or hashes match, then there has been no tampering. If the message signatures or hashes do not match, then there has been tampering and the provenance metadata is invalid. In one alternative, a blockchain may be used to track and validate the provenance meta-data.

In some embodiments, the location requirement associated with the target data may be determined to have been violated in response to identifying one or more location in the provenance that does not meet the location requirement. Essentially, if one of the records in the provenance metadata indicates that the data was accessed from a location that violates the location requirements, then the data access control module may determine that the provenance metadata has been tampered with.

In some embodiments, the data access control module of a computing device accessing the target data may automatically send a notification to a computing device of the data owner. Such notifications may keep the data owner informed about the data access locations and perhaps other information, such as the identity of a person that is accessing the target data, the time of the data access and/or the duration of the data access. The data access control module of the computing device may automatically send a notification to the data owner in response to determining that the current location of a data access or access attempt does not meet the location requirement or determining that at least one location identified in the provenance metadata does not meet the location requirement.

In some embodiments, there are no restrictions on the transmission or movement of the data. Therefore, the target data may be transmitted, copied, and/or accessed over the Internet or other local or wide area network to or among computing devices. For example, the target data may be accessed from a central data storage device, such as a data storage device under the control of the data owner. The target data may also be forwarded from the computing device of one user to the computing device of a subsequent user. Each user's computing device may access the target data so long as the location requirement is satisfied, and any other restrictions or requirements are also satisfied. Furthermore, there may also be multiple copies of the data and/or multiple users accessing the data at the same time so long as each data access occurs under conditions permitted by the rule set and the meta-data is verified. However, a reconciliation process may be implemented where multiple copies of the data exist, or multiple simultaneous accesses are permitted. Such a reconciliation process for the meta-data may be similar to the reconciliation processes implemented in a blockchain or in centralized meta-data tracking. In one example, the data access control module may receive a request for the target data from a requesting computing device and send the target data and the updated provenance metadata to the requesting computing device. Optionally, the location requirement or an expanded rule set may be sent along with the target data and updated provenance metadata.

Some embodiments do not restrict the manner in which the target data is accessed or the specific data type that may be accessed using the data access control module. Rather, any computing device that runs the data access control module may be used to access the target data so long as the rule set is satisfied. For example, the target data being accessed may include a document file in a particular format for use with a particular software application, such as a presentation data file formatted for an open-source presentation software application. Still, the data access control module must be run on the computing device to verify that the computing device satisfies the rule set before enabling the presentation data file to be accessed by the open-source presentation software application. In one option after enabling access to the target data, a data type of the target data may be identified, and the target data may be provided to an application program running on the computing device that is configured to handle data having the identified data type.

In one specific and non-limiting example, embodiments may be used to track and validate digital documents or manifests that would accompany a physical asset during shipment, such as when shipping computer hardware from a manufacturer or distributor to a customer. Embodiments would therefore only allow access to the documents or manifests at locations that are expected to be handling the computer hardware, and therefore identified in the location requirement or rule set, as the computer hardware is transported to the customer destination. In another example, embodiments may be used to track and validate data that is being sent between two parties across intermediaries, where the physical location of the intermediaries must meet the defined rule set. Other parties that might attempt to intercept or otherwise access the data from locations not identified in the rule set would be denied access to the data. Optionally, the location requirement may prevent access to the target data unless the current location of the computing device attempting the data access is the initial location, a location along the predetermined route, or the destination.

The foregoing computer program products may further include program instructions for implementing or initiating any one or more aspects of the operations and/or methods described herein. Apparatus embodiments are also provided, such as an apparatus including at least one non-volatile storage device storing program instructions and at least one processor configured to process the program instructions, wherein the program instructions are configured to, when processed by the at least one processor, cause the apparatus to perform the operations described in reference to the methods and computer program products.

FIG. 1 is a diagram of a system 10 including a plurality of computing devices including a data owner computing device 20 and other computing devices 40 that may attempt access to target data. The computing devices 20, 40 may communicate with each other over a network 12, such as a wide area network. Each of the computing devices 20, 40 may have the same or similar hardware architecture and each runs a data access control module.

In the non-limiting example of FIG. 1, the data owner computing device 20 runs a data access control module 21, stores data and metadata 22, and stores a rule set 23 including a location requirement for access to the data. The other computing devices 40 each run a data access control module 41 and each include a location detection entity 42, which may be a hardware component to detect or determine the location of the computing device 40. For example, the location detection entity 42 may be a GPS antenna, cellular antenna, or WiFi network card.

In accordance with various embodiments, a user may use a data access control module 41 running on one of the computing devices 40 to attempt access to target data in the data and metadata 22. However, in order to access the target data, the data access control module 41 must identify that the computing device 40 has a current location satisfying the location requirement or rule set 23. In addition, the data access control module 41 must determine that each previous location of data access by a computing device identified in the current provenance meta-data (in the data and metadata 22) associated with the data satisfies the location requirement or rule set 23 established by the data owner.

Figure 2:
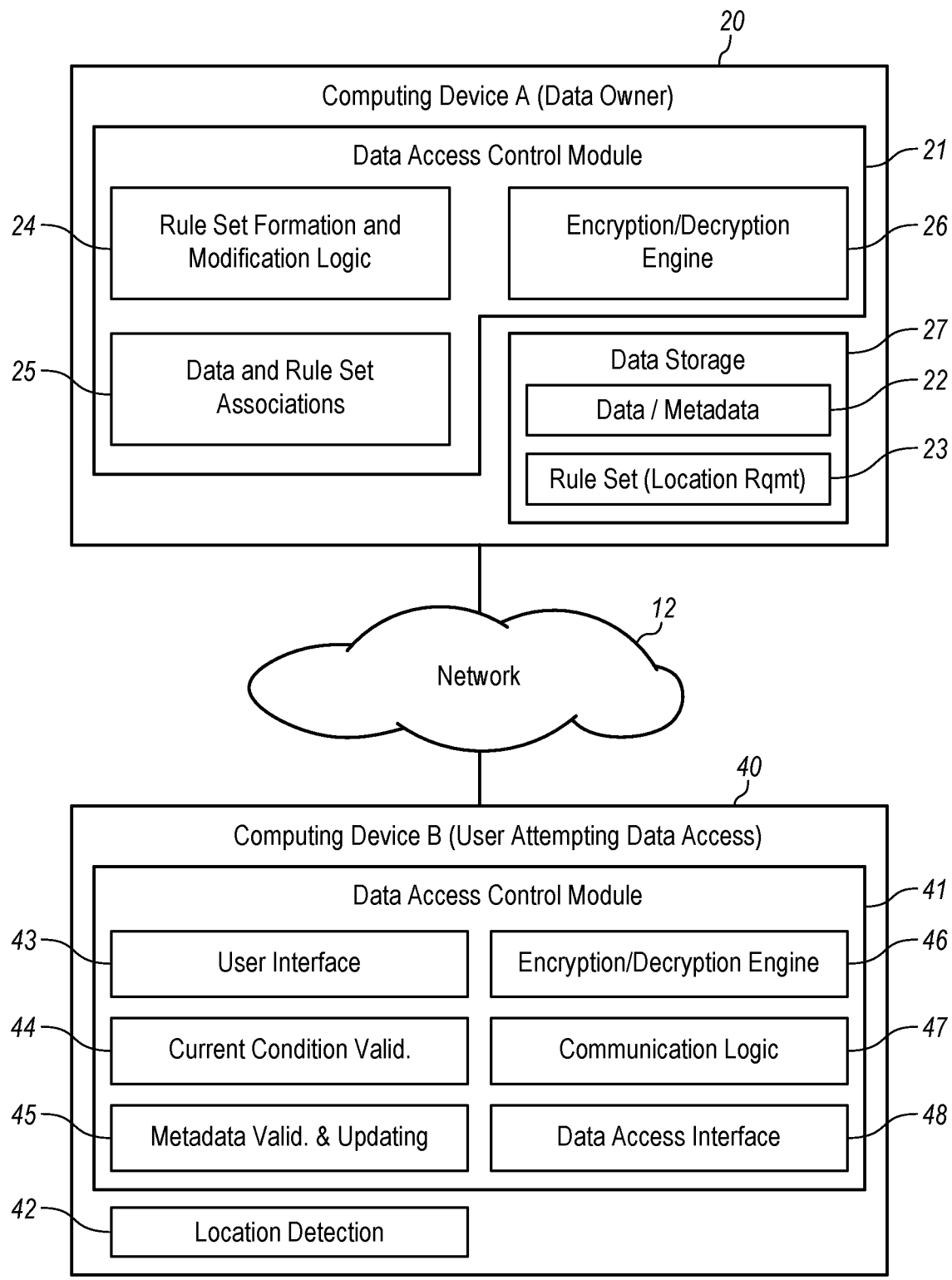
FIG. 2 is a diagram of a data owner computing device in communication with another computing device over a network.

FIG. 2 is a diagram of the data owner computing device 20 in communication with the computing device 40 of a user attempting to access the data portion of the data and metadata 22 over the network 12. The data owner computing device 20 runs the data access control module 21. The data access control module 21 includes a rule set formation and modification logic module 24, a data and rule set associations module 25, and an encryption/decryption engine 26. The rule set formation and modification logic module 24 may provide an interface and logic enabling the data owner to form and/or modify a rule set, such as a location requirement and/or one or more other restriction or requirement. The data and rule set associations module 25 may provide an interface and logic enabling the data owner to identify target data and associate a rule set with the target data. For example, the computing device 20 may include a data storage device 27 that stores the data and metadata 22 as well as the rule set 23 that includes the location requirement. Without limitation, the data and rule set may be associated by including a common identifier or tag, by virtue of being stored in a common file, folder or storage device/partition, or by being identified in a common record of a table established for the purpose of identifying the rule set with the data. The encryption/decryption engine 26 may include the logic for encrypting and decrypting the target data and/or the metadata 22.

A user attempting access to the target data may use the computing device 40 running the data access control module 41. The data access control module 41 includes a user interface module 43, current condition validation module 44, metadata validation and updating module 45, encryption and decryption engine 46, communication logic module 47, and data access interface 48. The user interface module 43 may provide a graphical user interface or other manner of interacting with the data access control module 41. Accordingly, the user interface module may be used to authenticate the user, identify the target data that the user wishes to access, and identify any application program that the user wants to have access to the target data. The current condition validation module 44 may include logic for detecting one or more current condition that may be necessary to validate against the rule set 23 associated with target data 22. For example, the current condition may include a current location of the computing device 40 as input from a location detection element 42, such as a GPS antenna or other location detection hardware and/or software. The metadata validation and updating module 45 may include logic for handling the metadata that is associated with the target data. For example, the metadata validation and updating module 45 may request the encryption and decryption engine 46 to decrypt the metadata, compare the metadata to the location requirements and any other restrictions of the rule set 23 associated with the target data. The metadata validation and updating module 45 may also update the metadata with current conditions and request the encryption and decryption engine 46 to encrypt the metadata. The user may also sign the new metadata through the metadata validation and updating module 45. In addition to encrypting and decrypting the metadata, the encryption and decryption engine 46 may be used to encrypt and decrypt the target data itself. The communication logic module 47 may be responsible for requesting and/or obtaining the target data, metadata and rule set. While the target data, metadata and rule set are illustrated being stored by the data owner computing device 20, the target data, metadata and rule set could be stored elsewhere such as a remote server or receiving via email or other communication channel. The data access interface 48 may provide an interface between the data access control module 41 and an application program (not shown) running on the computing device 40 that may use the target data. Accordingly, if access to the target data is enabled, then the application program may receive and use the target data in some manner.

The data access control module or application (software) 21 running on the data owner's computing device 20 and the data access control module or application (software) 41 running on the computing device 40 of the user attempting data access may include different modules or may each include all of the modules needed to provide the functionality that would be used by both the data owner and the user accessing the data. In one option, the data access control module may be part of an operating system that runs on a computing device. Accordingly, the target data would only be accessible by computing devices having an appropriate version of the operating system that included the data access control module. In another option, the data access control module may be a standalone software application that must be installed on the computing device.

Figure 3:
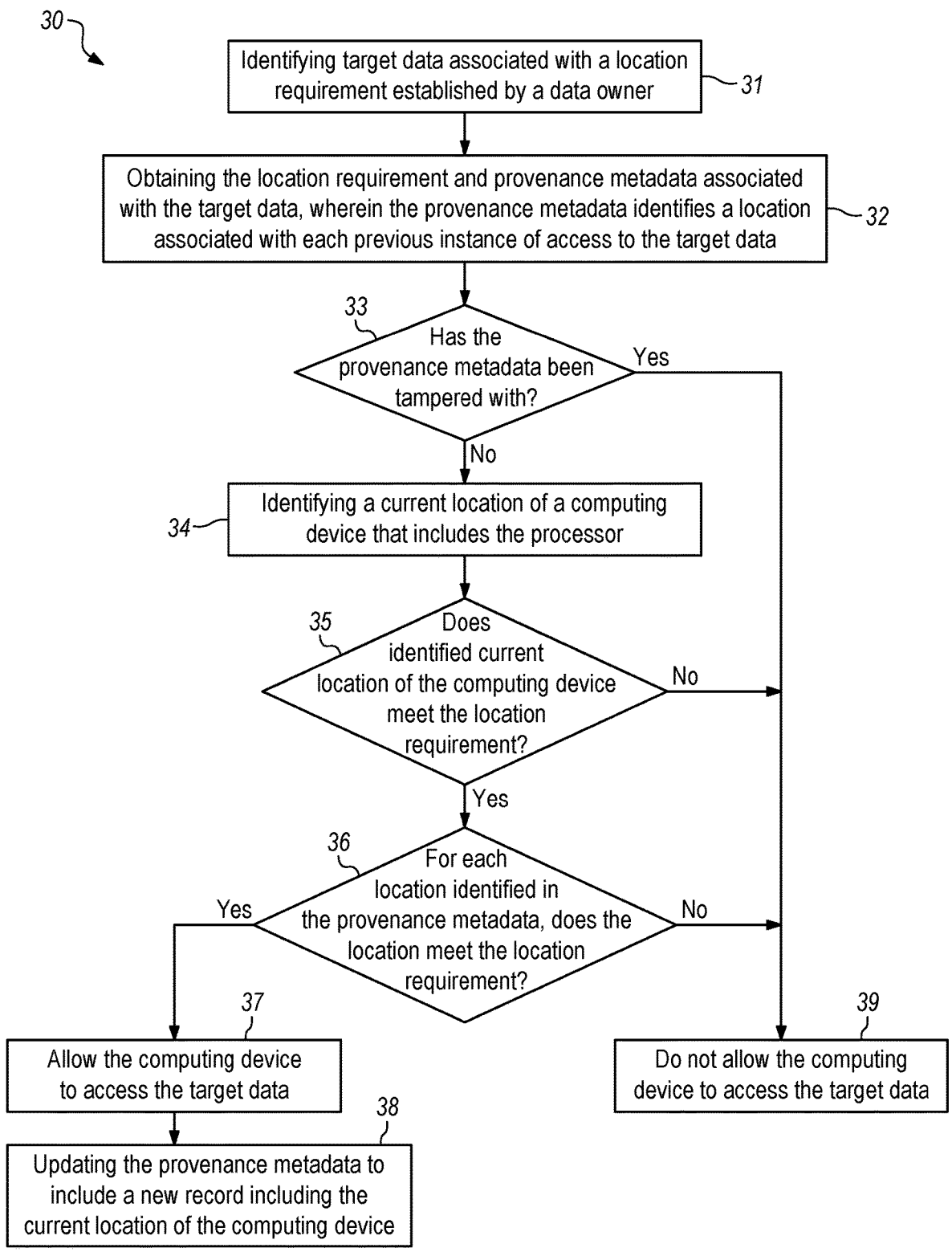
FIG. 3 is a flowchart of operations performed by a computing device attempting to access target data.

FIG. 3 is a flowchart of a process 30 including operations performed by a computing device 40 attempting to access target data. Operation 31 includes identifying target data associated with a location requirement established by a data owner. Operation 32 includes obtaining the location requirement and provenance metadata associated with the target data, wherein the provenance metadata identifies a location associated with each previous instance of access to the target data. Operation 33 includes determining whether the provenance metadata has been tampered with. If operation 33 determines that the provenance metadata has been tampered with, the process continues to operation 39 where the computing device is not allowed to access the target data. However, if operation 33 determines that the provenance metadata has not been tampered with, then the process continues to operation 34. Operation 34 includes identifying a current location of a computing device that includes the processor.

Operation 35 determines whether the identified current location of the computing device meets the location requirement. If a positive determination is made in operation 35, then the process continues to operation 36 to determine, for each location identified in the provenance metadata, whether the location meets the location requirement. If a positive determination is made in operation 36, then the process continues to operation 37. Operation 37 includes allowing the computing device to access the target data only in response to determining that the current location and each location identified in the provenance metadata meet the location requirement. Operation 38 includes updating the provenance metadata to include a new record including the current location of the computing device in response to allowing the computing device to access the target data. If a negative determination is made in either operation 35 or operation 36, then the process continues to operation 39, wherein the process does not allow the computing device to access the target data.

Figures 4A, 4B:
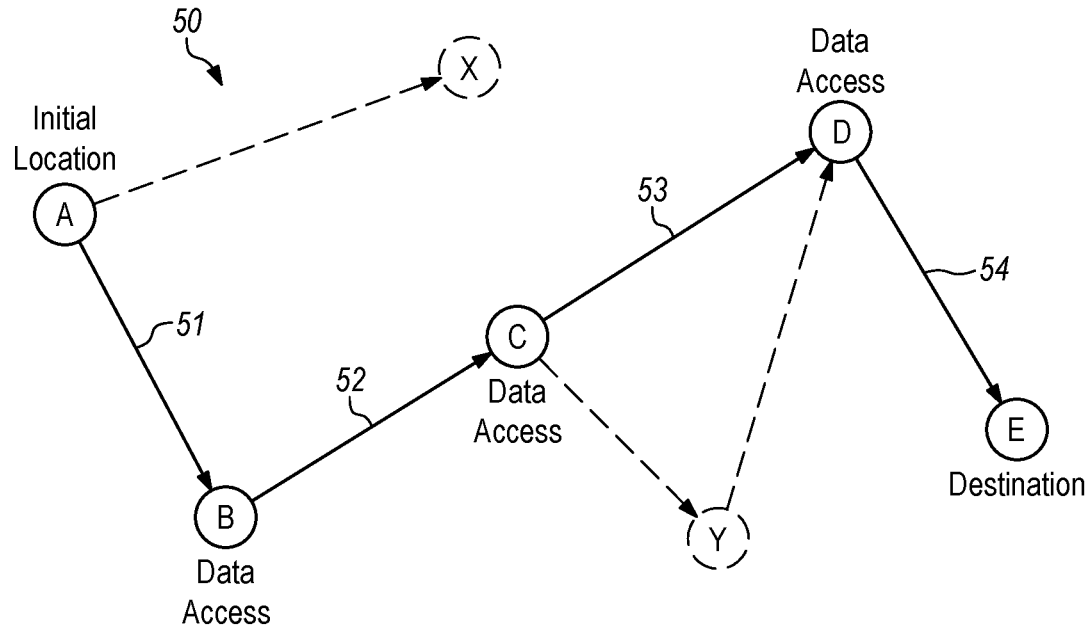
FIG. 4A is a schematic diagram of a map of approved and unapproved locations for data access along a shipping route.
FIG. 4B is a table of location requirements that identifies a list of approved locations for data access consistent with FIG. 4A.

FIG. 4A is a schematic diagram representing a map 50 of approved and unapproved locations for data access along a shipping route. FIG. 4B is a table 60 of location requirements that identifies a list of the approved locations for data access consistent with FIG. 4A. The shipping route includes four segments 51, 52, 53, 54. Along the shipping route, there are five (5) total approved locations for access to the target data, which may be a shipping manifest that includes a detailed description of the items in the shipment. The approved locations include an initial location A, a second location B, a third location C, a fourth location D, and a destination E. As shown in table 23 of FIG. 4B, the locations may be described by geographical coordinates (latitude and longitude), known locations of a cell tower, or the known location of a WiFi access point. In this non-limiting example, the initial location A is identified by latitude and longitude H, the second location B is identified by a wireless connection to a cell tower I, the third location C is identified by a wireless connection to a cell tower J, the fourth location D is identified by latitude and longitude K, and the destination E is identified by a WiFi access point L. Accordingly, a computing device running a data access control module according to a described embodiment may satisfy the location requirements 23 if the computing device is confirmed to be located in any one of the five approved locations A-E. However, a computing device running a data access control module according to a described embodiment would not satisfy the location requirements 23 if the computing device were in location X or Y and would be denied access to the target data.

Figure 5:
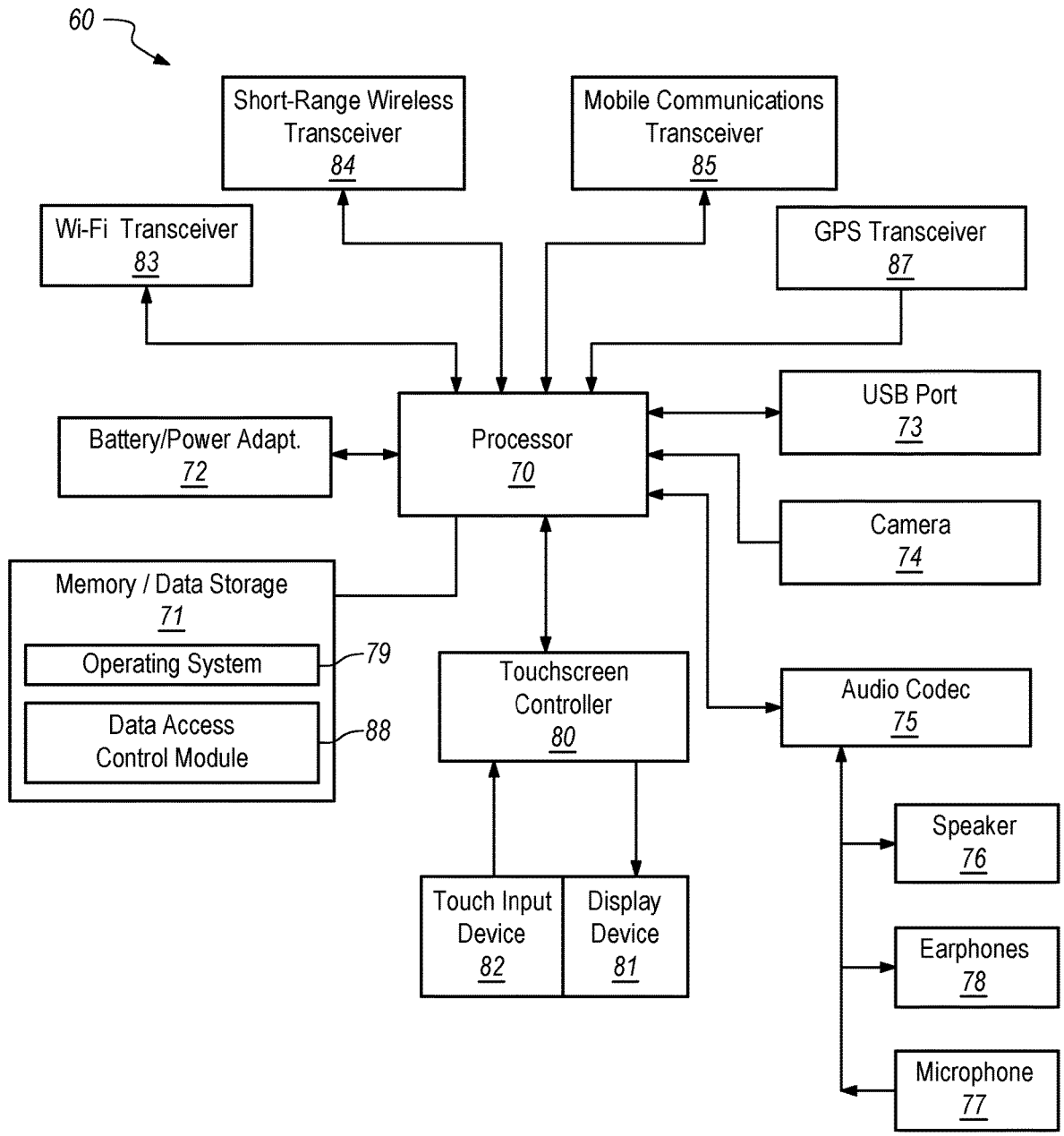
FIG. 5 is a diagram of a computing device, such as a user's computing device that is attempting access to target data.

FIG. 5 is a diagram of a computing device 60, such as a user's computing device that is attempting access to target data. The computing device 60 may be representative of the smartphone, tablet computer or a laptop computer, without limitation. The computing device 60 may include a processor 70, memory or data storage device 71, a battery (or other power source) 72, a universal serial bus (USB) port 73, a camera 74, and an audio codec 75 coupled to a built-in speaker 76, a microphone 77, and an earphone jack 78. The computing device 60 may further include a touchscreen controller 80 which provides a graphical output to the display device 81 and an input from a touch input device 82. Collectively, the display device 81 and touch input device 82 may be referred to as a touchscreen.

The computing device 60 may also include a short-range wireless transceiver 84, a wireless local area network transceiver ("Wi-Fi transceiver") 83, a mobile communication transceiver 85 for communication with a cellular communication network, and a global positioning system (GPS) transceiver 87. For example, the Wi-Fi transceiver 83 enables the formation of a wireless local area network connection with a Wi-Fi access point (not shown) at a particular location, such as location E in FIG. 4A.

The memory 71 may store one or more applications including program instructions that are executable by the processor 70. Such applications may include an operating system 79 and applications such as a data access control module 41. These applications including program instructions that may be executed by the processor 70 to cause the performance of various operations.

Figure 6:
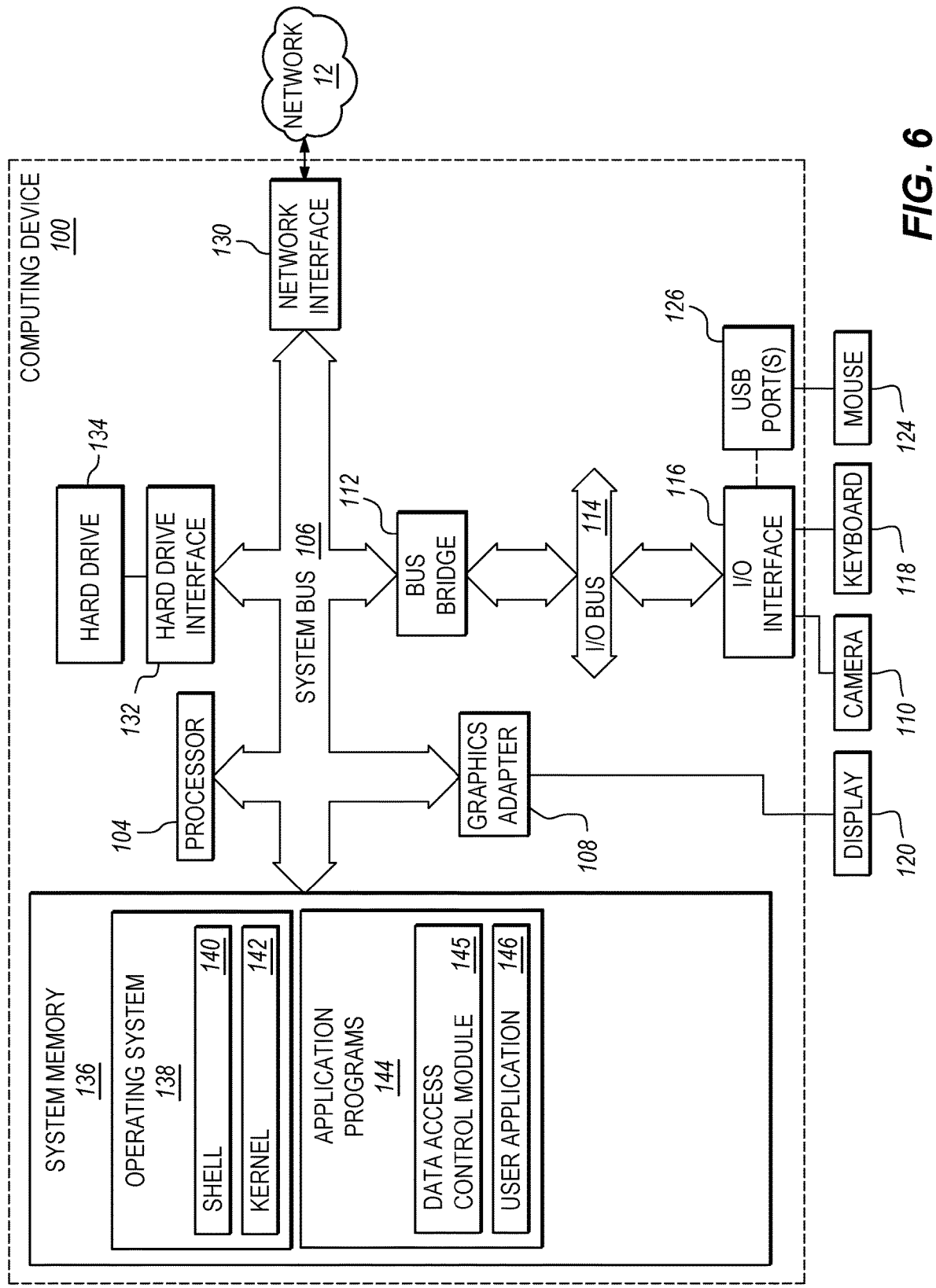
FIG. 6 is a diagram of a computing device, such as a data owner's computing device.

FIG. 6 is a diagram of an alternative computing device 100, such as a data owner's computing device 20 or a remote server. The computing device 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computing device 100 is able to communicate with other appliances or devices via the network 32 using a network adapter or network interface controller 130, such as a WiFi adapter. For example, the computing device 100 may be the data owner's computing device 20 or one of the other computing devices 40 shown in FIG. 1. Where the computing device 100 is being used to access target data, the network interface of WiFi adapter 130 may provide input identifying the location of the computing device. Other hardware components, such as a GPS antenna could also be added to the computing device 100.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computing device 100. This volatile memory may include additional higher levels of volatile memory (not shown), including, but not limited to, cache memory, registers and buffers. Data that populates the system memory 136 may include an operating system (OS) 138 and application programs 144. The hardware elements depicted in the computing device 100 are not intended to be exhaustive, but rather are representative. For instance, the computing device 100 may include non-volatile memory and the like.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the computing device 100 includes application programs 144 in the system memory of the computing device 100, including, without limitation, a data access control program 141 including program instructions that may be executed by the processor 70 to cause the performance of various operations according to embodiments disclosed herein, and a user application 146 capable of using the target data.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

identifying target data associated with a location requirement established by a data owner;

obtaining the location requirement and provenance metadata associated with the target data;

determining whether the provenance metadata has been tampered with, wherein the provenance metadata identifies a location associated with each previous instance of access to the target data, wherein the provenance metadata is determined to have been tampered with in response to identifying one or more location in the provenance metadata that does not meet the location requirement associated with the target data;

identifying a current location of a computing device that includes the processor;

determining whether the identified current location of the computing device meets the location requirement;

determining, for each location identified in the provenance metadata, whether the location meets the location requirement;

allowing the computing device to access the target data only in response to determining that the current location and each location identified in the provenance metadata meet the location requirement; and updating the provenance metadata to include a new record including the current location of the computing device in response to allowing the computing device to access the target data.

2. The computer program product of claim 1, wherein the identified target data is encrypted, wherein allowing the computing device to access the target data includes decrypting the identified target data and providing the computing device with access to the decrypted target data.

3. The computer program product of claim 1, the operations further comprising:

automatically sending a notification to the data owner in response to determining that the current location does not meet the location requirement.

4. The computer program product of claim 1, the operations further comprising:

automatically sending a notification to the data owner in response to determining that at least one location identified in the provenance metadata does not meet the location requirement.

5. The computer program product of claim 1, wherein the target data is contained within an identified file, folder, and/or data storage device.

6. The computer program product of claim 1, wherein the obtained provenance metadata is encrypted, the operations further comprising:
   decrypting the obtained provenance metadata; and
   encrypting the updated provenance metadata.

7. The computer program product of claim 6, the operations further comprising:
   causing the computing device to sign the new record of the provenance metadata with a digital signature of a user of the computing device.

8. The computer program product of claim 1, wherein the provenance metadata is stored in a private blockchain.

9. The computer program product of claim 1, wherein the location requirement is included in a rule set that further includes one or more additional conditions that must be met to allow the computing device to access the target data, wherein the one or more additional conditions include an identity of a person accessing the target data, a time of day during which the target data is accessible, and/or a date range during which the target data is accessible.

10. The computer program product of claim 1, wherein the target data, the location requirement and the provenance metadata are obtained from a common source.

11. The computer program product of claim 1, wherein identifying the current location of the computing device includes receiving input from an attached global positioning system (GPS) antenna.

12. The computer program product of claim 1, wherein identifying the current location of the computing device includes receiving a location of a cellular communication tower with which the computing device has formed a wireless connection or receiving a location of a wireless access point with which the computing device has formed a wireless connection.

13. The computer program product of claim 1, the operations further comprising:
   identifying a data type of the target data; and
   providing the target data to an application program running on the computing device that is configured to handle data having the identified data type.

14. The computer program product of claim 1, wherein the target data includes a shipping manifest identifying physical assets being shipped from an initial location along a predetermined route to a destination, and wherein the location requirement prevents access to the target data unless the current location of the computing device is the initial location, a location along the predetermined route, or the destination.

15. The computer program product of claim 1, wherein the provenance metadata identifies a timestamp associated each previous instance of access to the target data, and wherein the location requirement includes a first location requirement in force over a first time period and a second location requirement in force over a second time period.

16. The computer program product of claim 15, wherein determining, for each instance of access to the target data identified in the provenance metadata, whether the location meets the location requirement includes determining, for each instance of access to the target data identified in the provenance metadata, whether the location meets the location requirement that was in force at the timestamp associated with the instance of access to the target data.

17. The computer program product of claim 1, the operations further comprising:
   receiving a request for the target data from a requesting computing device; and
   sending the target data and the updated provenance metadata to the requesting computing device.

18. The computer program product of claim 1, wherein the provenance metadata identifies further information associated each previous instance of access to the target data, wherein the further information includes an identity of a user that accessed the target data, identity of a user device that was used to access the target data, and/or a date and time that the target data was accessed.

19. The computer program product of claim 1, wherein the provenance metadata for the target data is accompanied by a message signature or hash of the provenance metadata, and wherein determining whether the provenance metadata has been tampered with further includes:
   computing a message signature or hash of the provenance metadata associated with the target data; and
   determining that the provenance metadata has been tampered with in response to the computed message signature or hash not matching the message signature or hash accompanying the provenance metadata.

\* \* \* \* \*